United States Patent
Gardner et al.

(10) Patent No.: US 12,165,264 B2
(45) Date of Patent: Dec. 10, 2024

(54) DECOUPLED CONTENT MANAGEMENT SYSTEM FOR AUGMENTED REALITY

(71) Applicant: BundlAR, Chicago, IL (US)

(72) Inventors: Lewis B. Gardner, Chicago, IL (US); John Martin, Glencoe, IL (US); Thomas Gardner, Chelsea, AL (US); Zachary William Martin, Chicago, IL (US); Matthew Wren, North Riverside, IL (US); Gareth Davies, Chicago, IL (US)

(73) Assignee: BUNDLAR, Chicago, IL (US)

( * ) Notice: Subject to any disclaimer, the term of this patent is extended or adjusted under 35 U.S.C. 154(b) by 0 days.

(21) Appl. No.: 17/108,609

(22) Filed: Dec. 1, 2020

(65) Prior Publication Data
US 2021/0166487 A1    Jun. 3, 2021

Related U.S. Application Data

(60) Provisional application No. 62/942,583, filed on Dec. 2, 2019.

(51) Int. Cl.
| | | |
|---|---|---|
| G06T 19/00 | (2011.01) | |
| G06F 9/54 | (2006.01) | |
| H04L 67/131 | (2022.01) | |

(52) U.S. Cl.
CPC ............ *G06T 19/006* (2013.01); *G06F 9/547* (2013.01); *H04L 67/131* (2022.05)

(58) Field of Classification Search
None
See application file for complete search history.

(56) References Cited

U.S. PATENT DOCUMENTS

| | | | |
|---|---|---|---|
| 10,665,037 B1 | 5/2020 | Brimhall et al. | |
| 2014/0253743 A1* | 9/2014 | Loxam | G06T 11/00 |
| | | | 348/207.1 |
| 2018/0321970 A1* | 11/2018 | Cortes | G06F 9/4843 |
| 2020/0151927 A1* | 5/2020 | Guzman | G06T 11/60 |
| 2021/0019944 A1* | 1/2021 | McKeever | G06F 3/017 |
| 2021/0056762 A1* | 2/2021 | Robbe | G06F 16/29 |

OTHER PUBLICATIONS

Toole J., 'Combining artificial intelligence and augmented reality in mobile apps', [online, downloaded Dec. 2, 2023], https://heartbeat.comet.ml/combining-artificial-intelligence-and-augmented-reality-in-mobile-apps-e0e0ad2cfddc, Jun. 7, 2019.*

\* cited by examiner

*Primary Examiner* — Frank S Chen
(74) *Attorney, Agent, or Firm* — Saul Ewing LLP

(57) ABSTRACT

Methods, systems, and platforms for generating and deploying an augmented reality (AR) experience using a decoupled content management system is described herein. A method for providing an AR experience can include selecting a plurality of digital content associated with the AR experience from a content database at a decoupled CMS, defining one or more triggering mechanisms for actuating the AR experience, selecting one or more augmented reality assets based on a selected media asset type, generating an AR bundle comprised of at least one of the selected plurality of digital content, the one or more triggering mechanisms and the one or more augmented reality assets, and publishing the AR bundle to an end user application.

20 Claims, 5 Drawing Sheets

DECOUPLED CONTENT MANAGEMENT SYSTEM FOR AUGMENTED REALITY

CROSS-REFERENCE TO RELATED APPLICATION

This application claims priority to U.S. Provisional Application No. 62/942,583 filed on Dec. 2, 2019, which is hereby incorporated by reference.

FIELD OF THE INVENTION

The invention relates to the field of augmented reality (AR) technology. In particular, the invention relates to the generation and deployment of AR bundles so as to provide a customizable AR experience.

BACKGROUND OF THE INVENTION

Augmented reality (AR) can be used to enhance a user's perception of reality within their physical environment. One way to do this is to use a mobile device to provide sensory inputs using various digital content such as sound, video, or dynamic 3D graphics at certain times and places. Providing this type of digital content in a physical space can provide a user with a comprehensive AR experience.

Oftentimes, a content management system (CMS) is used to implement the AR experience. A CMS is used to manage the creation, modification, and timing of digital content that is used to provide the AR experience. There are several different types of content management systems. A monolithic CMS is a single system that handles all aspects of the digital content, from creation to user viewing, allowing users to manage (e.g., create, import, edit, store, publish, etc.) digital content and delivering that digital content to viewers of the content through a controlled "view" layer. These types of monolithic CMS can generally consist of a separate database where the content is stored and a predefined set of technology and structure that the developer is forced to use in creating an AR experience. Since the technology and structure is predefined, there is a limit to the types of AR experiences that a developer can create.

A headless CMS is a system that allows users to manage digital content, but the content is delivered via an application programming interface (API) without the CMS controlling the view layer.

Conventional monolithic and headless content management systems are limited in their ability to manage AR experience distribution. For example, because a monolithic system, by design, works to deliver on a single platform, it cannot deliver full functionality across multiple platforms (e.g.—web, mobile, head mounted display). Additionally, since a headless CMS does not have control over the "view" layer of the content it distributes, and since AR experiences are very specifically defined by how the digital content is triggered and/or anchored to the physical world, a headless CMS cannot distribute "augmented reality" experiences, but instead is limited to only delivering the digital content that can be displayed via augmented reality. These limitations mean that a conventional CMS—monolithic or headless—cannot allow content creators to create and distribute AR experiences in useful ways, from a single point, across multiple destination platforms, while defining the nature of the AR experience(s)—both the digital content and the way it is triggered and anchored to the physical world Accordingly, there is a need for an improved CMS capable of overcoming these disadvantages with respect to AR technology.

SUMMARY OF THE INVENTION

Methods and systems for the generation and deployment of augmented reality bundles are described herein. In one aspect, a content management platform for an AR experience can include a decoupled content management system (CMS) including: a content database for storing a plurality of AR bundles each having user-defined digital content, one or more user-defined triggers, and at least one user-selected asset media package relating to the AR experience, an action management system in connection with the content database and having the one or more user-defined triggers, and a media index for storing the at least one user-selected asset media package, and an AR application programming interface (API) adapted to publish at least one of the plurality of the AR bundles to a selected end user application.

This aspect can have a variety of embodiments. In some cases, the selected end user application is adapted to receive the at least one AR bundle from the AR API, and execute the at least one AR bundle on an end device. In some cases, the AR API is further adapted to publish the at least one AR bundle prior to an initiation of an execution of the at least one AR bundle by the selected end user application.

In one embodiment, the CMS further includes an application database for storing a plurality of application configurations. In some cases, the at least one AR bundle is configured corresponding to at least one user-selected application configuration of the plurality of application configurations.

In some cases, the one or more user-defined triggers comprise at least an image marker, a geolocation trigger, a geofence trigger, an AR button, an artificial intelligence (AI) trigger, facial tracking, hand tracking, body tracking, vertical plane tracking, horizontal plane tracking, a point cloud, or a combination thereof. In some cases, the user-defined digital content further includes user-generated digital content.

In one aspect, a method for providing an AR experience can include selecting a plurality of digital content associated with the AR experience from a content database at a decoupled CMS, defining one or more triggering mechanisms for actuating the AR experience, selecting one or more augmented reality assets based on a selected media asset type, generating an AR bundle comprised of at least one of the selected plurality of digital content, the one or more triggering mechanisms and the one or more augmented reality assets, and publishing the AR bundle to an end user application.

This aspect of the invention can have a variety of embodiments. In some cases, the end user application executes the AR bundle on an end device regardless of the contents of the AR bundle. In one embodiment, the method further includes publishing the AR bundle prior to an initiation, by the end user application, of an execution of the AR bundle. In one embodiment, the method further includes configuring the AR bundle to be published for the end user application based on an AR application configuration of a plurality of application configurations stored by the decoupled CMS.

In some cases, the one or more triggering mechanisms comprise at least an image marker, a geolocation trigger, a geofence trigger, an AR button, an artificial intelligence (AI) trigger, facial tracking, hand tracking, body tracking, vertical plane tracking, horizontal plane tracking, a point cloud, or a combination thereof. In some cases, the plurality of digital content further includes user-generated digital content.

In one aspect, a decoupled CMS for providing an AR experience can include an action management system having a plurality of triggers, a media index for storing a plurality of asset media packages, a digital content database for storing a plurality of digital content packages, and a bundle engine connected to the action management system, the media index, and the digital content database, the bundle engine configured to bundle at least one user-selected digital content package, at least one user-selected trigger, and at least one asset media package to form an AR bundle related to the AR experience.

This aspect of the invention can have a variety of embodiments. In one embodiment, the CMS further includes a CMS database connected to the bundle engine for storing a plurality of AR bundles, where the bundle engine is further configured to transmit the AR bundle to the CMS database. In some cases, the CMS database is configured to transmit the AR bundle to an AR API for publishing the AR bundle to an end user application.

In one embodiment, the CMS further includes an applications database for storing a plurality of application configurations. In some cases, wherein the AR bundle is configured corresponding to at least one user-selected application configuration of the plurality of application configurations. In some cases, the at least one user-selected trigger includes at least an image marker, a geolocation trigger, a geofence trigger, an AR button, an artificial intelligence (AI) trigger, facial tracking, hand tracking, body tracking, vertical plane tracking, horizontal plane tracking, a point cloud, or a combination thereof. In some cases, the user-selected digital content further includes user-generated digital content.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DETAILED DESCRIPTION OF THE INVENTION

The detailed description set forth below in connection with the appended drawings is intended as a description of the presently preferred embodiments of the invention and is not intended to represent the only forms in which the present invention may be constructed or utilized. The description sets forth the system, methods, and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The detailed description set forth below relates to an AR platform which can be used to customize and enhance an end user's perception of reality within their physical environment by affecting sensory inputs through digital content such as sound, video, haptics, dynamic 3D graphics and combinations thereof. This AR platform assists in facilitating AR integration into various end-user applications so as to provide a versatile end-user AR experience.

In particular, the present invention relates to a decoupled content management system (CMS) for providing augmented reality content through augmented reality (AR) bundles to enhance an end user's AR experience. The decoupled CMS described herein allows for a developer, or someone who is tasked with customizing and creating an AR experience for an end-user, to generate and store a multitude of customizable AR bundles having desired digital content, different AR content or media types, and AR trigger types. Further, these AR bundles can be deployed to a multitude of end user applications for execution. Thus, the decoupled CMS described herein provides multiple customizable options for AR bundle generation and deployment.

Figure 1:
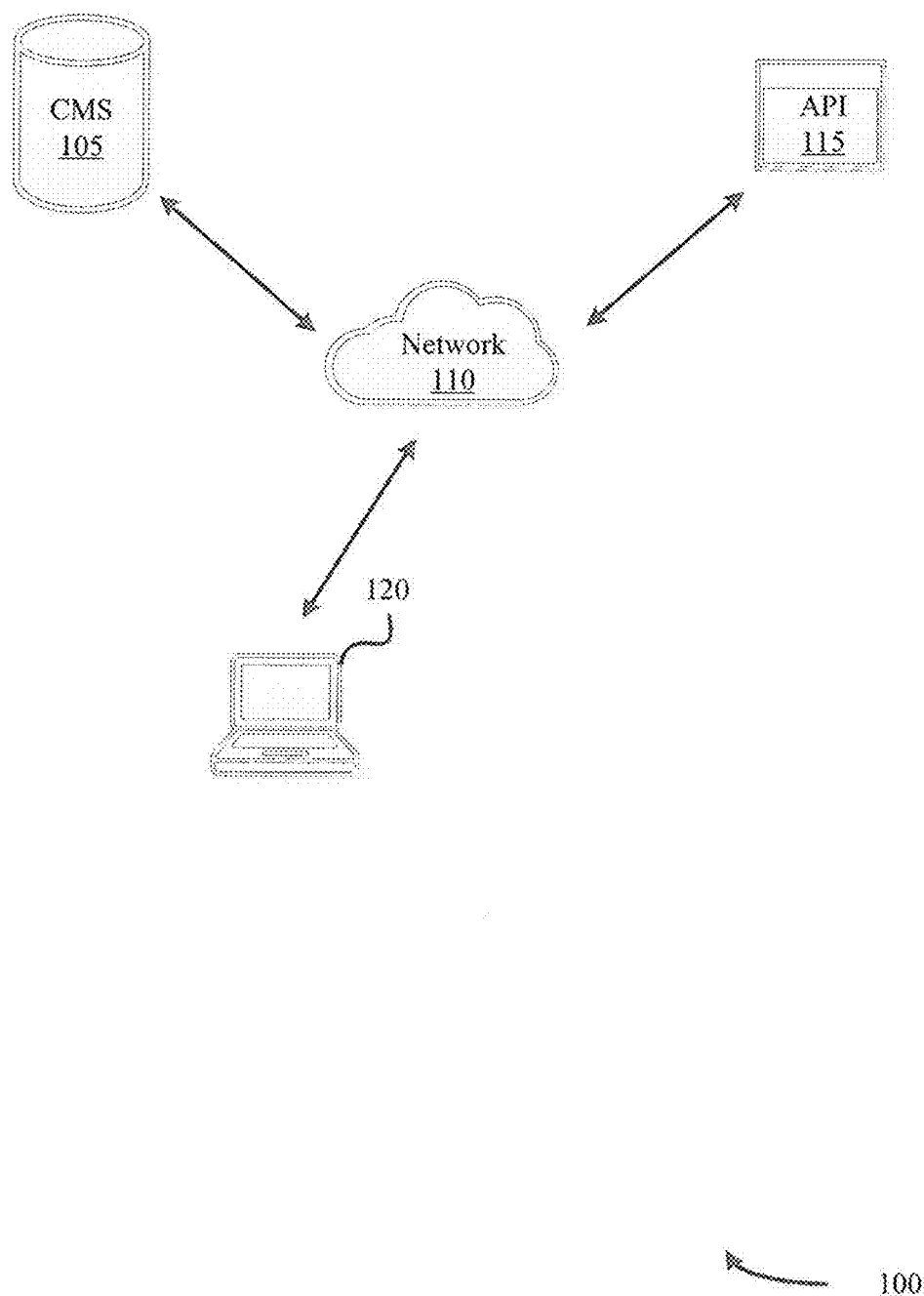
FIG. 1 illustrates a system for AR bundle generation and deployment, in accordance with an embodiment of the claimed invention.

FIG. 1 depicts a platform 100 for AR bundling and deployment, according to an embodiment of the claimed invention. The platform 100 can include a decoupled CMS 105, a network 110, an application programming interface (API) 115, and an end user device 120. The CMS 105, API 115, and end device 120 can communicate over a network 110 which can be a wired network, a wireless network, or a combination thereof. In some cases, the network 110 can include a cloud network. In some cases, portions of the API 115 can be configured to communicate directly with the CMS 105 (e.g., the API 115 and the CMS 105 can be hardwired).

Figure 3:
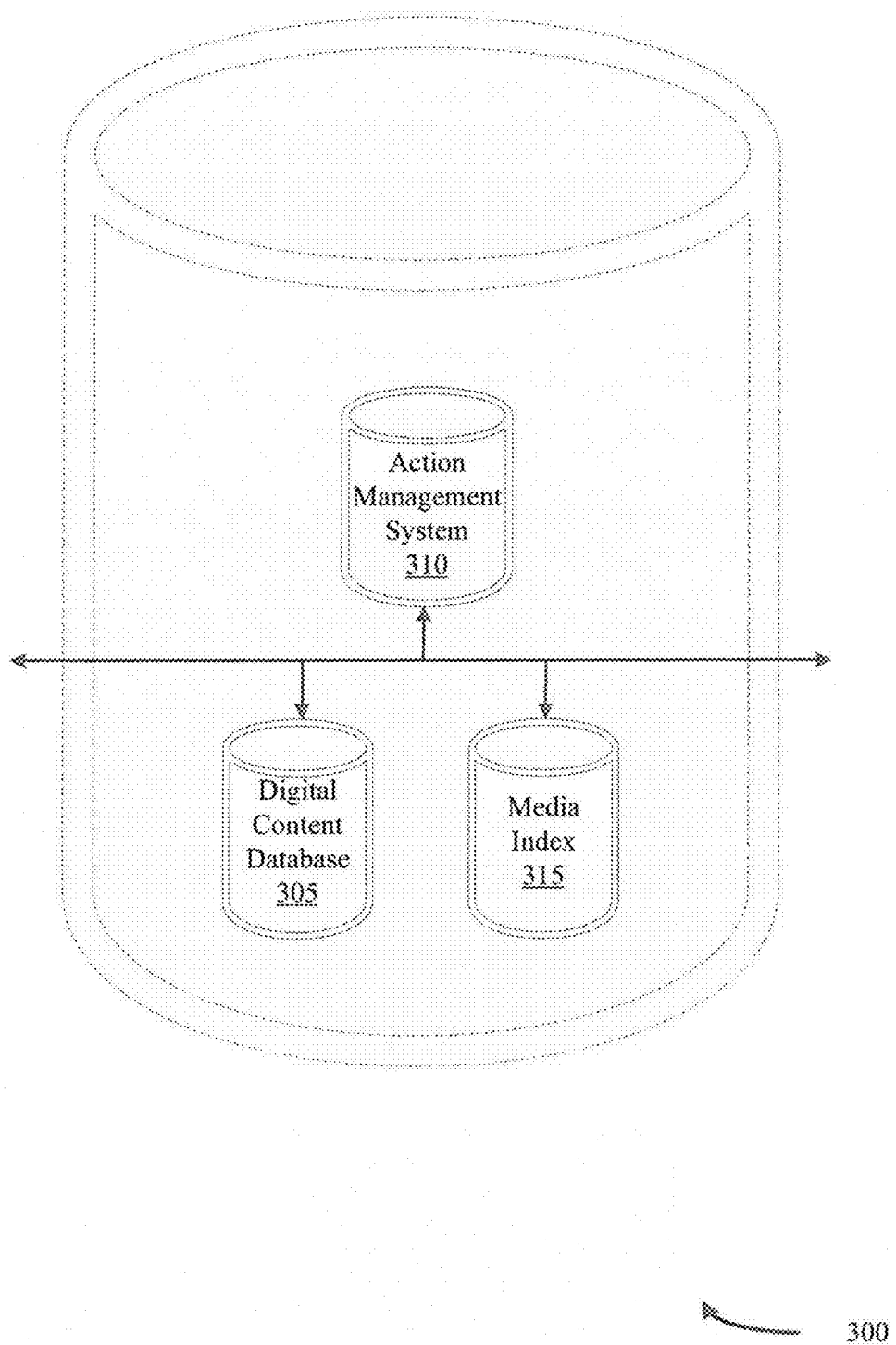
FIG. 3 illustrates a decoupled CMS for AR content, in accordance with an embodiment of the claimed invention.

As shown in FIG. 3, a decoupled CMS 300 can be used to generate, or "bundle," customizable AR experiences for publishing to an end-user 120. An AR experience can include any variations of the digital content, trigger mechanisms, and/or media assets selections made by the developer. This allows the developer to take a customizable "mix-and-match" approach to an AR experience. The developer can also have control over what constitutes the AR experience as viewed by an end user. An advantage to providing such AR "bundles" to an end-user is that it can save memory and limit internet access requirements.

The decoupled CMS 300 can include various databases and storage elements so as to facilitate the providing of a customizable AR experience to the end-user device 120. In one example, the CMS 300 can include a digital content database 305, an action management system 310, and a media index 315.

The digital content database 305 can store and manage customizable digital content packages that a developer can use to store within an AR bundle. Additionally or alternatively, the digital content packages can be generated based on input received from a developer. For example, the digital content can be any data object that generates an AR experience in the physical environment through a computing device (e.g., a tablet, mobile phone or the like). The digital content can also include a virtual object, an application, script, advertisements, games, workflows, tactile, plans, etc.

Further, AR content stored by the decoupled CMS 300 can be generated by a developer or can be previously uploaded to the decoupled CMS 300.

The action management system 310 can store and manage customizable trigger mechanisms for an AR bundle. Additionally or alternatively, the trigger mechanisms can be generated based on input received from the developer. In one example, these trigger mechanisms can be used to activate selected digital content from the AR bundle by the computing device. For example, AR triggers mechanisms can be based on object recognition, motion estimation, location estimation, and the like. Examples of AR triggers can be a geofence, a geolocation identifier, natural feature tracking, image recognition, user interaction, an AR button, an artificial intelligence trigger, a BUNDLAR Augmented Reality Kit (BARK) trigger, a SLAM/WorldSpace trigger, a Point-Cloud trigger, facial tracking, hand tracking, body tracking, and the like.

The media index 315 can store and manage customizable media files for an AR bundle. The media files can be customizable based on input received from a developer. Additionally or alternatively, the media files can be generated based on input received from a developer. Such media assets can include the types of media that will be displayed or presented by the computing device. For example, assets can include video files, audio files, photographs, 3D images, dynamic 3D models and the like. Assets can be embedded within the AR experience and can be activated by a trigger mechanism along with the AR digital content. Further, assets can either be previously stored by the CMS 300, or can be alternatively uploaded by a web user for the generation of an AR experience.

The CMS 300 can also store a variety of application configurations which can include data for translating or formatting bundled AR experiences into a compatible format of an application.

Accordingly, a developer can leverage the CMS 300 to combine different stored components to generate a desired AR bundle. The CMS 300 can also provide the customizable AR experience to the end-user. For example, the CMS 105 of FIG. 1 can bundle one or more of the digital content packages, one or more trigger mechanisms, and one or more media assets for creating a specific and designed AR experience. The AR bundle can be configured according to a stored application configuration. Further, the digital content package(s), the trigger(s), the asset(s), the application configuration, or a combination thereof, can be selected by user input received via the API 115.

Figure 2:
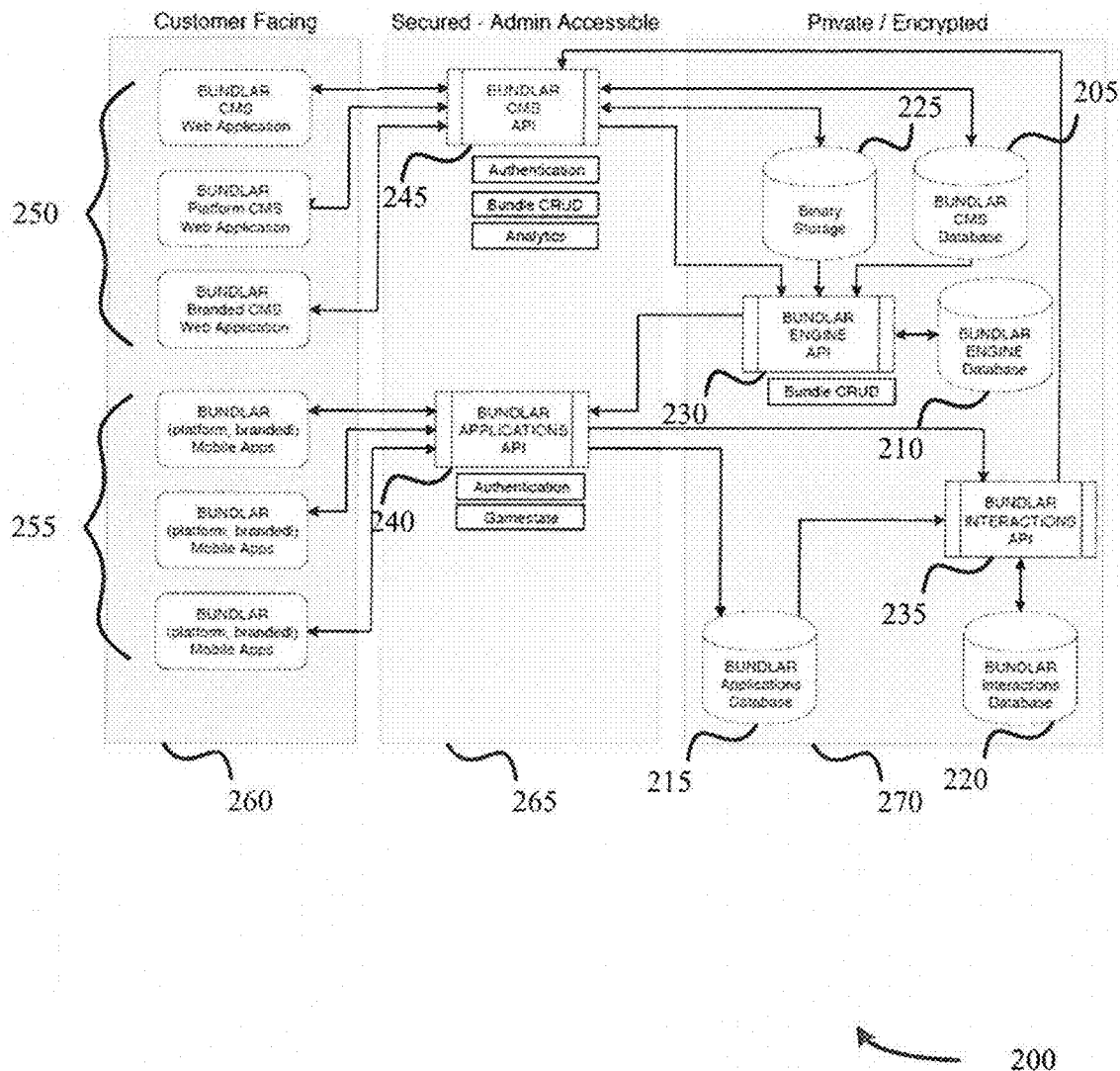
FIG. 2 illustrates a system for AR bundle generation and deployment, in accordance with an embodiment of the claimed invention.

In some cases, the decoupled CMS 300 can be adapted or configured to include various aspects of a system for AR bundle generation and deployment, such as system 200 of FIG. 2. For example, the CMS database 205, the engine database 210, the applications database 215, or a combination thereof, can be a part of the decoupled CMS 300 and the digital content database 305, an action management system 310, and a media index 315.

Referring to FIG. 1, the API 115 can be an interface or communication protocol between a client and a server. The API 115 can also take the form of an operating system, database system, computer hardware, software library, or web-based system. In this example, the API 115 interfaces with the CMS 105 and the end user device 120. Further, the API 115 can also provide an interface between various components of the CMS 105, and can also provide an interface between the CMS 105 and a user (e.g., via a web interface).

Once an AR bundle is created, the API 115 can publish the AR bundle to an application on the end user device 120. The end device application can be selected by a user for receiving the AR bundle. In some cases, the API 115 can publish the AR bundle prior to the end device application initiating an execution of the AR bundle. Thus, the end user application can execute the AR bundle without an active connection to the API 115 or the CMS 105.

The end device 120 can include any type of device capable of supporting the execution of the AR bundle. For example, the end device 120 can be any one of a computer, laptop, tablet, mobile phone, head mounted display, server, etc.

As shown in FIG. 2, AR platform system 200 for creating and publishing the AR experience includes customer facing applications and interfaces 260, a secured—administration accessible column 265, and a private and encrypted section 270.

The secured-administration column 265 includes components which an administrator of the system architecture 200 has access to.

The private and encrypted section 270 are components of the system which can be encrypted and neither the developer nor end-user has access to. This section 270 can include a CMS database 205, an engine database 210, an application database 215, an interaction database 220, binary storage 225, BundlAR Engine API 230, and BundlAR Interactions API 235.

As discussed herein, the CMS database 205 can store components used to generate an AR bundle for providing the AR experience. In some cases, the CMS database 205 can include a content database for storing AR content, an action management system for managing AR triggers, a media index for storing media assets, or a combination thereof. In some cases, the CMS database 205 can be a component of the decoupled CMS 105 as described in FIG. 1.

The engine database 210 can store core logic for the system architecture 200. The application database 215 can store various application configurations for formatting an AR bundle to be compatible with an end device application. Further, the engine database 210 can store previously generated AR bundles.

The interaction database 220 can store various analytics associated with execution of an AR bundle. For example, data received from an end user application corresponding to the execution of the AR bundle (e.g., time of execution, data related to how an end user interacted with the AR bundle upon execution, etc.) can be stored at the interaction database 220.

Binary storage 225 can store various stored data of the system architecture 200 in binary format. The binary formatting can in some cases mitigate memory and processing requirements for various components of the system architecture 200, and thus the data stored in binary storage 225 can be dynamic and dependent upon the types and volume of data stored by the various components at any given time.

The BundlAR Engine API 230 can interface the engine database 210 with the CMS database 205, the binary storage 225, and the like. The engine API 230 can be a private, web-based API that combines and translates AR bundle data from the CMS for delivery across a multitude of delivery channels. Different delivery channels (e.g., Android & iOS mobile applications, webXR, devices such as HoloLens or MagicLeap, etc.) can require AR information to be presented to them in different ways. The engine API 230 reconfigures this information (e.g., that is initially created visually or input via the CMS API 245) to function and display across different types of views. The CMS can allow customers to determine how, where, to which delivery channels, to which users, and the like, AR bundles are delivered. The engine API 230 can prepare the AR data for delivery to the different delivery channels. The engine API 230 can then deliver the prepared bundles to the Applications API 240 when an appropriate request is made.

The Interactions API 235 can interface an interactions database to other components within the system. For example, the interactions API 235 can interface the interactions database 220 to the application database 215. The interaction API 235 can facilitate the storing of analytics received from an end device application corresponding to an executed AR experience. The interactions API 235 can control both the input and storage of this data, as well as its secure, sorted, and limited retrieval by parties with appropriate access as defined through access control defined by the CMS API 245.

The BundlAR CMS API 245 can interface a user with the decoupled CMS. For example, the CMS API 245 can interface a CMS web application 250 (e.g., upon instructions by a web user) and the decoupled CMS database 205. The CMS API 245 can facilitate the generation of AR bundles by receiving input from a web user corresponding to the selection of individual components of an AR bundle. The CMS API 245 can also facilitate the generation of these individual components by providing a web user a platform to create digital content, upload media assets, create and/or define triggers, and the like. The CMS API 245 can store data related to the creation of AR content, for example, how a 3D model can be associated with an image marker trigger, and how the 3D model is positioned and scaled to that trigger. The CMS API 245 can deliver AR bundles (e.g., application and customer-specific collections of one or more related AR experiences) to the engine API 230. The CMS API 245 can also allow a user to determine and control when and how AR bundles are deployed to staging and production application environments.

Users can also access interaction data through the CMS API 245. Interactions data can be stored in the interactions data base 220. The interactions data can also be encrypted when stored, so access to an unencrypted format of the interactions data can be provided by the CMS API 245.

Additionally, the CMS API 245 can facilitate authentication tasks (e.g., receiving username and login information of a web user), and can further verify that an authenticated user gains access to AR data that the user is authenticated for. Further, the CMS API 245 can process, create, read, update, delete (CRUD) instructions from a web user.

The BundlAR Application API 240 can interface the decoupled CMS with an end user application. The application API 240 can receive an AR bundle (e.g., from the engine API 230) and publish the AR bundle to the end device application. Further, the application API 240 can receive analytics corresponding to the execution of an AR bundle from the end device application, which can then be stored by an interactions database.

The application API 240 can be a web-based API that allows the mobile applications 255 (e.g., mobile applications, platform mobile applications such as eXpoReality or PublishReality, client applications, and web and/or device specific applications, etc.) to retrieve AR bundle data for displaying augmented reality experiences. The application API 240 can manage authentication and user accounts for access to viewing AR experiences. The application API 240 can provide the augmented reality bundle data to the mobile application 255, formatted as necessary for that specific application. For example, iOS applications require AR data in a different format than android devices. The applications API 240 can deliver application-specific data only to the appropriate applications. The applications API 240 can also provide for cloud based tracking of gamestate, for example by keeping track of a user's progress through a tour or treasure hunt. The applications API 240 can also provide a gateway for the AR framework applications to record interaction data. The applications API 240 can also strip personally identifying information from the interaction data and store it separately from the interaction data (e.g., providing for GDPR and COPPA compliance), and then transmit the interaction data to the Interactions API 235 for storage.

The customer facing application 260 includes the components of the system 200 to which the developer has access. For example, web applications 250 can generate a web session or web portal for a web user to communicate with the CMS API. Web applications 250 can be any number of web applications that support communication between a web user and the system architecture 200. For example, web applications 250 can include platform applications, which can be managed by a particular web platform (e.g., eXpoReality or PublishReality, etc.). In some cases, web applications 250 can include brand applications, which can be applications managed by particular third-party clients. In some cases, web applications 250 can include applications managed by administrators of the AR system (e.g., system 100), such as BUNDLAR. In some cases, web applications 250 can require user authentication prior to permitting or receiving access to communications with other components of the system architecture 200.

The customer facing application 260 also includes mobile applications 255 that can receive and execute AR bundles from the system architecture 200. Mobile applications 255 can be any number of applications which support the reception and execution of an AR bundle from the system architecture 200. Additionally, mobile applications 255 can transmit interaction data corresponding to an executed AR bundle for storage in an interaction database. Mobile applications 255 can be stored on an end device, such as end device 120 of FIG. 1, and in some cases can require user authentication prior to permitting or receiving access to communications with other components of the system architecture 200.

Figure 4:
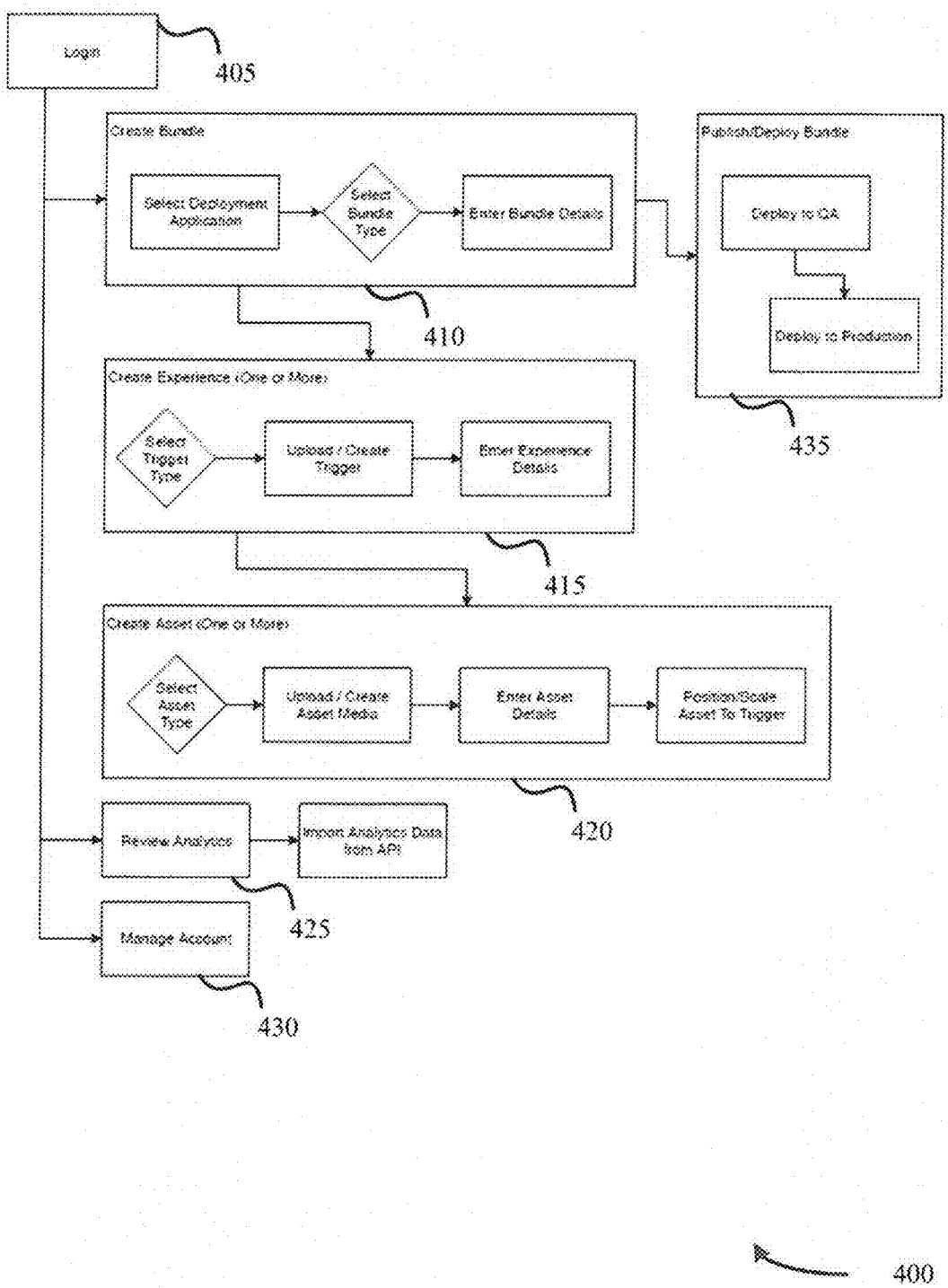
FIG. 4 is a flow diagram illustrating a system for AR bundle generation and deployment, in accordance with an embodiment of the claimed invention.

Referring to FIG. 4 a process 400 for generating an AR bundle according to an embodiment of the claimed invention is illustrated. At 405, a developer can log into to a web account. The account can provide the developer access to the decoupled CMS 300. At 410, the developer can create an AR bundle. As described herein, the developer can select various components of an AR experience to be generated for inclusion within the AR bundle such as an end device application type, a bundle type, and bundle details, which are described in more detail below.

At 415, a developer can select an AR triggering mechanism to be included in the AR bundle. This permits the developer to select a trigger mechanism type, to upload or create a trigger (e.g., define the trigger) and can enter experience details. In some cases, the trigger type, the trigger, the experience details, or a combination thereof can be stored by a decoupled CMS, or alternatively be uploaded by the user.

At 420, the developer can select a media or AR asset for inclusion within the AR bundle. The AR asset can include an image file, a video file, an audio file, a 3D graphic, an animation, a haptic response definition, or a combination thereof. The AR asset can be stored by a decoupled CMS or alternatively be uploaded by the user. Further, the developer can position or scale the asset to a selected trigger (e.g., selecting a location on a display screen, a time for displaying the asset in relation to an activated trigger, etc.).

Indeed, this process permits the developer to create and customize all aspects associated with an AR experience including the specifics of the digital content to be provided, the trigger mechanisms, and the media or AR assets.

Once assembled, the developer can send the AR bundle to quality assurance to ensure that the AR bundle is correctly generated and then publish or deploy 435 the AR Bundle to a selected end device application for execution.

Optionally, at 425, a developer can review analytics from an executed AR bundle including time values (e.g., when the AR bundle was executed, etc.), a recording of the executed experience, and the like. Additionally, analytics can be imported from the API 115. These analytics may relate to any type of end-user information including name, address, type of usage of the AR, and the like.

The developer is also free to manage his or her account, update the developer profile information, contact information, billing information, and the like.

Figure 5:
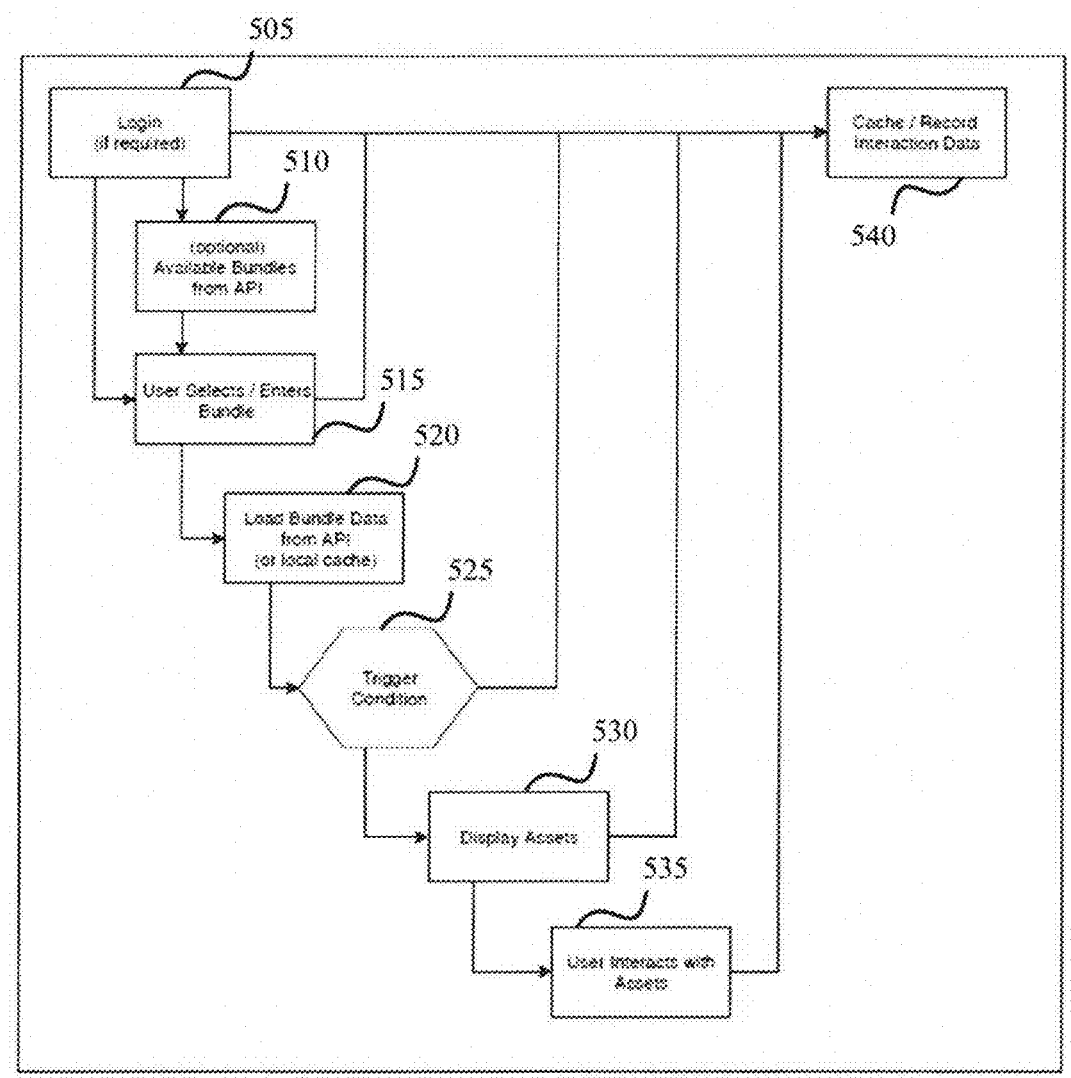
FIG. 5 is a flow diagram illustrating AR bundle generation and deployment, in accordance with an embodiment of the claimed invention.

FIG. 5 depicts an end-user perspective process flow 500 for generating and executing an AR bundle according to an embodiment of the claimed invention. In some cases, the process flow 500 can be implemented at least in part by platform 100, system architecture 200, by the decoupled CMS 300, or a combination thereof, as described with reference to FIGS. 1-3.

At 505, a user can log into a web account, similar to 405 of FIG. 4. At 510, the user can optionally review available AR bundles that have been previously generated. These AR bundles can be stored by a decoupled CMS, such as CMS 105 or CMS 300 of FIGS. 1 and 3.

At 515, the user can select or enter an AR bundle. The user can select various stored components that comprise an AR bundle, such as digital content, a trigger, asset media, and the like.

At 520, the AR bundle can be published to an end device application. The end device application can download the AR bundle from an API, such as API 115 of FIG. 1. The download can occur prior to the end device application executing the AR bundle. Alternatively, the end device application can load the AR bundle from a local cache.

At 525, a trigger condition can be activated. Trigger conditions can include a geofence, a geolocation identifier, an AR button, an artificial intelligence trigger, a BARK trigger, a SLAM/WorldSpace trigger, a PointCloud trigger, facial tracking, hand tracking, body tracking, and the like.

At 530, asset media can be displayed. Asset media can include video files, audio files, image files, and the like.

At 535, an end user can interact with the displayed assets. For example, the end user can click an attached link to a webpage, reposition the display in relation to the displayed asset media, and the like. At 540, the user interaction with the displayed asset media, and associated analytics, can be recorded and subsequently stored by a decoupled CMS.

EXAMPLE

As an example, a developer can direct a web browser to access the decoupled CMS (e.g., via CMS API). The web browser displays options to the developer for selecting a variety of the components for generating an AR experience. The developer can view or search for a compilation of digital content packages for an AR experience. For example, the digital content packages include digital buttons, a digital recreation of a person, a digital recreation of a car, and the like. The developer selects a digital button for the AR experience.

The developer next can view or search for a compilation of trigger mechanisms for an AR experience. The trigger mechanisms include options for an image marker, a geolocation trigger, an audio trigger, a geofence trigger, an interaction based trigger, an A controlled trigger, particular object triggers like a stop sign, a face, a hand, a body, a tree, etc., and the like. The developer generates a new object trigger for a particular street sign on a university campus. For example, the developer selects a street sign trigger and uploads a photo of the particular university street sign to generate the trigger.

The developer then has the option of selecting media assets for the AR experience. The developer can have access to a compilation of stored media assets, such as an image of a boat, a recording of a song, a video clip of a sports event, and the like. The developer generates and selects a new media asset by uploading an audio clip pertaining to a brief history of the particular university. Once the digital content, trigger, and media asset are selected, the decoupled CMS can then bundle these components into an AR bundle.

The developer can also select a particular end device application that will execute the AR bundle. The developer selects a university tour application for executing the end device. The decoupled CMS can then format the AR bundle corresponding to a compatible format for the university tour application.

An end device, such as a mobile phone, with the university tour application can download the AR bundle (e.g., either directly when opening the application or by indirectly through software updates, etc.). An end user can open the university tour application and use the mobile phone screen to view the university when on campus. When the end user approaches the particular campus sign, the AR bundle can execute (e.g., the application detects the sign as the trigger). The digital content of the digital button can "pop-up" on the mobile phone screen. The end user can interact with the AR experience by pressing the digital button through the mobile phone's touch screen. The media asset of the audio recording can then run over the speakers of the mobile phone, providing the end user with information relating to a history of the university.

Thus, the web user can mix and match various AR experience components that the web user desires, without being limited by content, trigger types, application types, etc.

The invention claimed is:

1. A content management platform for providing an augmented reality (AR) experience, comprising:
   a decoupled content management system (CMS) comprising:
      a content database for storing user-defined digital content;
      an action management system having one or more user-defined triggers; and
      a media index for storing at least one user-selected asset media package;
   a CMS application programming interface (API) adapted to generate a plurality of AR bundles, each of the AR bundles including a combination of any of the user-defined digital content, any of the one or more user-defined triggers, and any of the at least one user-selected asset media packages; and
   an AR API adapted to publish at least one of the plurality of the AR bundles to a selected end user application.

2. The content management platform of claim 1, wherein the selected end user application is adapted to:
receive the at least one AR bundle from the AR API; and
execute the at least one AR bundle.

3. The content management platform of claim 1, wherein the AR API is further adapted to:
publish the at least one AR bundle prior to an initiation of an execution of the at least one AR bundle by the selected end user application.

4. The content management platform of claim 1, wherein the CMS further comprises:
an application database for storing a plurality of application configurations.

5. The content management platform of claim 4, wherein the at least one AR bundle is configured corresponding to at least one user-selected application configuration of the plurality of application configurations.

6. The content management platform of claim 1, wherein the one or more user-defined triggers comprise at least an image marker trigger, a geolocation trigger, a geofence trigger, an AR button, an artificial intelligence (AI) controlled trigger, facial tracking, hand tracking, body tracking, vertical plane tracking, horizontal plane tracking, a point cloud, or a combination thereof.

7. The content management platform of claim 6, wherein the one or more user-defined triggers comprise the AI controlled trigger.

8. A method of providing an augmented reality (AR) experience using a decoupled content management system (CMS) and an AR application programming interface (API), comprising:
selecting a plurality of digital content associated with the AR experience from a content database at the decoupled CMS;
defining one or more triggering mechanisms for actuating the AR experience;
selecting one or more augmented reality assets based on a selected media asset type;
generating, with a CMS API, an AR bundle comprised of at least one of the selected plurality of digital content, the one or more triggering mechanisms and the one or more augmented reality assets; and
publishing, with the AR API, the AR bundle to an end user application;
wherein defining the one or more triggering mechanisms is independent of selecting the plurality of digital content; and
wherein the CMS API is configured to link any of the one or more triggering mechanisms to any of the independently selected plurality of digital content during the generating of the AR bundle.

9. The method of claim 8, wherein the end user application executes the AR bundle on an end user device regardless of a composition of the AR bundle.

10. The content method of claim 8, further comprising:
publishing the AR bundle prior to an initiation, by the end user application, of an execution of the AR bundle.

11. The method of claim 8, further comprising:
configuring the AR bundle to be published for the end user application based on an AR application configuration of a plurality of application configurations stored by the decoupled CMS.

12. The method of claim 8, wherein the one or more triggering mechanisms comprise at least an image marker trigger, a geolocation trigger, a geofence trigger, an AR button, an artificial intelligence (AI) controlled trigger, facial tracking, hand tracking, body tracking, vertical plane tracking, horizontal plane tracking, a point cloud, or a combination thereof.

13. The method of claim 12, wherein the one or more triggering mechanisms comprise the AI controlled trigger.

14. A decoupled content management system (CMS) for a content management platform for providing an augmented reality (AR) experience, comprising:
an action management system having a plurality of triggers;
a media index for storing a plurality of asset media packages;
a digital content database for storing a plurality of digital content packages; and
a bundle engine connected to the action management system, the media index, and the digital content database, the bundle engine configured to bundle at least one user-selected digital content package, at least one user-selected trigger, and at least one asset media package to form an AR bundle related to the AR experience;
wherein the at least one user-selected digital content package is selected independently of the at least one user-selected trigger;
wherein the AR bundle comprises any combination of the user-defined digital content, the one or more user-defined triggers, and the at least one user-selected asset media package relating to the AR experience; and
wherein the AR bundle is arranged to be published to a user by a separate AR application programming interface (API).

15. The CMS of claim 14, further comprising:
an engine database connected to the bundle engine for storing a plurality of AR bundles, wherein the bundle engine is further configured to transmit the AR bundle to the engine database.

16. The CMS of claim 15, wherein the engine database is configured to transmit the AR bundle to an AR application programming interface (API) for publishing the AR bundle to an end user application.

17. The CMS of claim 14, further comprising:
an applications database for storing a plurality of application configurations.

18. The CMS of claim 17, wherein the AR bundle is configured corresponding to at least one user-selected application configuration of the plurality of application configurations.

19. The CMS of claim 14, wherein the at least one user-selected trigger comprises at least a geolocation trigger, a geofence trigger, an AR button, an artificial intelligence (AI) controlled trigger, facial tracking, hand tracking, body tracking, vertical plane tracking, horizontal plane tracking, a point cloud, or a combination thereof.

20. The CMS of claim 19, wherein the at least one user-selected trigger comprises the AI controlled trigger.

* * * * *